United States Patent
Horton et al.

(10) Patent No.: US 10,511,712 B2
(45) Date of Patent: Dec. 17, 2019

(54) CALLER IDENTIFICATION IN A SECURE ENVIRONMENT USING VOICE BIOMETRICS

(71) Applicants: Andrew Horton, Sarasota, FL (US); Sebastian Mascaro, Championsgate, FL (US)

(72) Inventors: Andrew Horton, Sarasota, FL (US); Sebastian Mascaro, Championsgate, FL (US)

( * ) Notice: Subject to any disclaimer, the term of this patent is extended or adjusted under 35 U.S.C. 154(b) by 0 days.

(21) Appl. No.: 15/330,977

(22) Filed: Aug. 19, 2016

(65) Prior Publication Data

US 2018/0205823 A1 Jul. 19, 2018

(51) Int. Cl.
| | |
|---|---|
| H04M 3/42 | (2006.01) |
| H04M 3/537 | (2006.01) |
| G10L 17/00 | (2013.01) |
| G10L 17/04 | (2013.01) |
| G10L 17/06 | (2013.01) |

(52) U.S. Cl.
CPC ....... H04M 3/42068 (2013.01); G10L 17/005 (2013.01); G10L 17/04 (2013.01); G10L 17/06 (2013.01); H04M 3/537 (2013.01); H04M 2203/6054 (2013.01); H04M 2250/74 (2013.01)

(58) Field of Classification Search
CPC ............... H04M 3/42; H04M 2201/40; H04M 2203/6054; H04M 3/2281; H04M 3/42221; H04M 3/42068; H04M 3/537; H04M 2250/74; G10L 17/005; G10L 17/04; G10L 17/06
See application file for complete search history.

(56) References Cited

U.S. PATENT DOCUMENTS

| | | | | |
|---|---|---|---|---|
| 6,101,242 | A * | 8/2000 | McAllister | H04Q 3/0045 379/201.02 |
| 9,560,193 | B1 * | 1/2017 | Hogg, Jr. | H04M 3/2281 |
| 9,609,121 | B1 * | 3/2017 | Hodge | H04M 3/2281 |
| 9,721,571 | B2 * | 8/2017 | Lousky | G10L 17/04 |
| 2005/0063522 | A1 * | 3/2005 | Kim | H04M 1/271 379/88.02 |
| 2005/0129189 | A1 * | 6/2005 | Creamer | G10L 17/26 379/88.02 |
| 2007/0155366 | A1 * | 7/2007 | Manohar | H04M 1/2535 455/411 |

(Continued)

*Primary Examiner* — Lisa Hashem (74) *Attorney, Agent, or Firm* — Diserio Martin O'Connor & Castiglioni LLP (57) ABSTRACT

A method for passive enrollment and identification of a telephone caller to a called telephone number, comprising the steps of audio recording a telephone call; identifying and separating any multiple speakers on the telephone call and specifying a one of the multiple speakers; creating a net speech portion of the telephone call by trimming portions of audio recording from the beginning and end of the audio recording; processing the net speech portion against an existing Biometric Voice Print (BVP) database; creating a new BVP for the at least one of the multiple speakers if no match of the net speech portion against the BVP database is found in the processing step; comparing subsequent calls against the BVP, whether existing or created, to identify the at least one of the multiple speakers; and associating in a cluster all subsequent calls having voice prints matching the BVP.

15 Claims, 4 Drawing Sheets

(56) References Cited

U.S. PATENT DOCUMENTS

| | | | | |
|---|---|---|---|---|
| 2008/0201143 | A1* | 8/2008 | Olligschlaeger | H04M 3/2281 704/235 |
| 2010/0088231 | A1 | 4/2010 | Eugenio | G06Q 20/28 705/44 |
| 2011/0286585 | A1* | 11/2011 | Hodge | H04M 1/67 379/88.02 |
| 2014/0379339 | A1* | 12/2014 | Timem | G10L 17/22 704/246 |
| 2014/0379340 | A1* | 12/2014 | Timem | G06F 21/32 704/246 |
| 2017/0099387 | A1* | 4/2017 | Keiser | H04M 3/4365 |
| 2017/0149962 | A1* | 5/2017 | Hodge | H04M 3/2281 |
| 2018/0151182 | A1* | 5/2018 | Wyss | G06F 3/167 |
| 2018/0213082 | A1* | 7/2018 | Hodge | H04M 3/2281 |
| 2019/0122670 | A1* | 4/2019 | Roberts | G10L 17/005 |
| 2019/0228779 | A1* | 7/2019 | Lesso | G10L 15/08 |
| 2019/0243956 | A1* | 8/2019 | Sheets | G06F 16/903 |

\* cited by examiner

CALLER IDENTIFICATION IN A SECURE ENVIRONMENT USING VOICE BIOMETRICS

RELATIONSHIP TO OTHER APPLICATIONS AND PATENTS

The present invention draws priority from Provisional U.S. Patent Application No. 62/277,957, filed Jan. 12, 2016. Further, U.S. Pat. No. 9,237,232 to Williams et al., issued Jan. 12, 2016, is incorporated by reference herein in its entirety.

TECHNICAL FIELD

This application generally relates to a system and method for identifying callers in secure environments, such as correctional facilities, by using voice biometrics, wherein the identity of speakers in both directions in calls originating either inside or outside the facility are of great interest to the management of such facilities. The term "system" as used herein comprises both hardware and at least one software algorithm.

BACKGROUND OF THE INVENTION

There is an increasing need to identify callers and to monitor communications in controlled environments, such as corrections facilities, military bases, or other such government institution. Voice identification systems are needed when the speaker is not otherwise known. The present invention will materially contribute to countering terrorism from increased detection and surveillance of unauthorized telephone calls within secure facilities such as prisons or other government facilities. The proliferation of unauthorized cellular telephone in prisons increases the chance that high-risk inmates may continue to plan illegal activities even while in detention. Traditional means of monitoring of all telephone traffic may be impractical, may infringe civil liberties of non-inmates, or may simply be ineffective. Only a small portion of telephone calls between inmates and the outside are actually monitored because of limited resources.

Prior art solutions providing caller identification using voice biometrics have limitations. Prior art formal enrollment of users is an especially cumbersome and time-consuming process because a reliable prior art enrollment requires a substantial amount of speech to be captured and typically requires cooperation of the caller. To date, this has limited the adoption of voice biometrics as a means of telephone-based authentication in secure facilities.

Systems of the prior art typically compare a voice sample from the speaker against an existing library of previously-acquired and archived Biometric Voice Prints (BVPs). Verification typically occurs only at the beginning of an interaction and, once achieved, is considered as valid for the whole interaction. This does not allow for instances wherein the validation of the individual's identity can be completed correctly, but the interaction is then taken up by another party. This is a serious potential flaw for those interactions requiring a very high standard of identity verification.

What is needed is a voice recognition system that monitors the identity of the actual speakers continuously over the lifetime of a call originated in either direction.

US Patent application 2013/0044867 to Walters et al. teaches the use of voice biometric software to analyze inmate telephone calls. A system and method for managing and controlling telephone activity in a correctional facility comprises providing a first communicative connection between a caller and a recipient, delivering the conversation between the caller and the recipient over the first communicative connection and executing voice biometrics software to evaluate the conversation. A detection response is executed based upon the evaluation of the biometrics software.

Incorporated U.S. Pat. No. 9,237,232 to Williams et al. discloses systems and methods for analyzing digital recordings of the human voice in order to find characteristics unique to an individual. A biometrics engine may use an analytics service in a contact center to supply audio streams based on configured rules and providers for biometric detection. The analytics service may provide ca audio data and attributes to connected engines based on a provider-set of selection rules. The connected providers send call audio data and attributes through the analytics service. The engines are notified when a new call is available for processing and can then retrieve chunks of audio data and call attributes by polling an analytics service interface. A mathematical model of the human vocal tract in the call audio data is created and/or matched against existing models. The result is analogous to a fingerprint, i.e., a pattern unique to an individual to within some level of probability.

The system has no disclosed capability for continuously monitoring the identity of the caller over the lifetime of a call, nor for ensuring that the same persons are talking through the call, nor to generate an alert if another party is added to the call. Further, the system is directed to identifying an incoming caller but makes no provision for identifying the receiving party as well, which can be vital within a secure environment such as a prison. Further, the system is not configured for identification of persons outside a secure environment who are receiving calls from within the secure environment.

Systems of the prior art are also limited in their focus on the calling party as opposed to the called party. Inmates, in particular, are generally allowed to call only a restricted list of phone numbers, typically family or friends. No prior art system currently is able to verify the identity of the called party, which could be a major source of fraud.

In current systems, calls are typically initiated by the inmate to the outside world. However, there is a need for telephone systems that can identify callers from the outside while allowing such callers to initiate calls and leave voicemails for inmates, although the practical impossibility of formally enrolling every potential caller has prevented the deployment of such solutions.

Currently, biometric identification is not used in voicemail systems as part of communications networks in secure facilities in part because of the difficulty in identifying callers. This is a major security risk since most of the communication allowed in a correctional environment is based on the premise that the facility always knows who is involved in the conversation. Current generation voicemail products do very little, if anything, to identify the person that is leaving the message for the inmate. The prior art process is usually as follows, though some variations exist among providers:

1) friend/family member calls a toll-free number;
2) IVR provides the option for Voice Mail; this could be one of many options for the caller;
3) system checks that funds are available in the friend and family member's prepaid account (this process could occur in a different order);
4) once the Voice Mail option is selected, the following options may exist in the system:

a) the system may check to see what inmates have called the caller; these would be the options/inmates that are offered to the caller to leave a Voice Mail;

b) alternatively, the system may ask the caller to input the inmate ID of the inmate for whom the caller would like to leave a message; (Note that the system could theoretically search for the inmate as well, based on name, etc.)

5) caller leaves a Voice Mail up to a time limit (limits range typically from one to three minutes).

There is therefore a need for a system capable of accurately and automatically identifying the caller without the need for a formal enrollment process or specialized staff, and capable of ensuring that the same person(s) is talking throughout a call.

SUMMARY OF THE INVENTION

The passive detection system of the current disclosure provides capabilities for caller identification to and from secure facilities using natural speech without formal enrollment and without recognition of such a covert identification process by either the caller or the receiver. Previously-recorded calls are used to automatically create a Biometric Voice Print (BVP). By comparing a person's voice against BVPs stored in a database, that person's identity can be verified in a fully-transparent manner without the need for any active enrollment. The passive detection system can be used to verify the identity of persons both inside and outside the facility and to detect known persons-of-interest (POI) in subsequent calls. In a preferred embodiment, a person with an existing voice-print can be automatically authenticated with high accuracy after only seven seconds of net speech. In another embodiment, a new BVP can be created for a person not previously known to the system after only 30 seconds of net speech. The disclosure also provides methods for using the system in secure facilities and for voicemail applications. The secure facility handling the call will be notified in real time if a caller is a known person inside the facility, a person-of-interest, a previous caller, or a new caller, all without the inconvenience of formal enrollment or multiple personal questions.

In a currently preferred embodiment, the system may assist in the search for and monitoring of persons-of-interest (POIs) by instantly alerting security personnel once a POI has been identified.

In another embodiment, the system continuously ensures that the same persons are talking throughout the call and may generate an alert if another party is added to the call or one of the previously identified speakers is replaced.

The information system of the present disclosure is a data-centric platform for the identification of callers in secure facilities such as corrections facilities. The system can be deployed as a stand-alone application or as a module of a greater system.

The system platform provides unique information management and reporting services on communication activities between populations inside and outside the facility. It allows users to analyze patterns in the detection data and their relationship to various POIs.

One aspect of the present disclosure is the ability to aggregate recordings from multiple sites into a single, centralized location.

In an embodiment of the system, the BVP is continuously updated based on the new recordings. The quality of an initial BVP acquired during a first call may therefore be improved with information acquired during subsequent calls.

Another aspect of the information system of the present disclosure is that the speaker authentication is fully text independent and requires no prompting. The authentication process can therefore be conducted transparently without interrupting the flow of conversation.

Another aspect of the system is the ability to authenticate callers in any language.

Still another aspect of the present disclosure is the ability to authenticate callers from live calls or from pre-recorded calls.

Still another aspect of the present disclosure is the ability to authenticate callers against a previously generated BVP with as little as seven seconds of net speech.

Still another aspect of the present disclosure is the ability to reduce false positive acceptance rates to less than 0.1% with a positive acceptance rate greater than 90%.

Still another aspect of the present disclosure is that it can be used on any communication channel, such as a landline telephone, mobile, VoIP, microphone, satellite, etc.

Still another aspect of the present disclosure is that the system can monitor continuously the identities of persons on both ends of a call and can generate an alert if an identity changes on either end of the call.

Still another aspect of the system is that it is very robust for cross-channel authentication. It can create a BVP in a specific channel (a landline for instance) and then complete authentications from other, different channels (mobile, VoIP, or video/audio for instance).

BRIEF DESCRIPTION OF THE DRAWINGS

The disclosure, both as to organization and method of practice, together with further objects and advantages thereof, may best be understood by reference to the following description taken in connection with the accompanying drawings in which.

DETAILED DESCRIPTION OF THE INVENTION

A novel system and method are disclosed to passively enroll and authenticate individuals inside secure facilities and persons-of-interest (POI) outside such facilities during both live telephone calls and pre-recorded calls (phone message), and to monitor continuously the identity of one or more speakers in a telephone call. The enrollment and authentication process, as described in greater detail hereinbelow, is completely invisible to the speakers.

The system cuts down on costs significantly since there is no need to formally enroll persons inside the facility, which typically requires substantial supervisor's time during the enrollment process. Further, the process is text and language independent. The only required element to create an initial BVP for a speaker is at least one call of more than 30 net seconds of speech for that particular speaker, although additional calls are necessary to creation of a high-quality BVP as described below.

A unique aspect of the system not found in the prior art is the ability to automatically create BVPs of POIs outside the facility. A system limited to authenticating POIs inside the secure facility alone would offer limited incremental value over other forms of authentication. The secure facility knows the general location of any inmate at all times and a caller from within the facility can only be one among a very limited set of possible candidates, depending on the housing breakdown. On the other hand, a real need for the facility is the ability to identify the individuals receiving outgoing calls from within the facility who could possibly be involved in a criminal activity in collusion with the inmates. The current disclosure describes an automated process to create BVPs for the caller as well as the called party in calls originating either inside or outside a facility.

In a world where a telephone number is largely meaningless for identification purposes, being able to authenticate callers by voice alone is a critical feature. Previous methods of the prior art, requiring a formal enrollment process of all callers, make this impossible. The process of the current disclosure makes authenticating by voice alone a reality by being able to use a recording to create a BVP of a new caller in as little as 30 second of net speech, and then to monitor caller identities during the remainder of a call.

1. Passive Enrollment of Speakers

In a currently preferred embodiment, a high quality BVP can be generated from processing recordings of multiple calls. The number of calls is not critical, although it has been found that three is a satisfactory number of calls with which to work, provided that at least 30 seconds of net speech is available for processing.

In a currently preferred embodiment, the system can process calls recorded at different times and from different numbers. This method captures different characteristics of the caller's voice, training the system to recognize the caller in different circumstances, and produces a high-quality BVP.

2. Creation of a BVP without Formal Enrollment

In a currently preferred embodiment, the system of the disclosure relies on a plurality of pre-recorded calls to create a BVP of a target speaker without formal enrollment. The BVP can also be produced during a live call.

Figure 1:
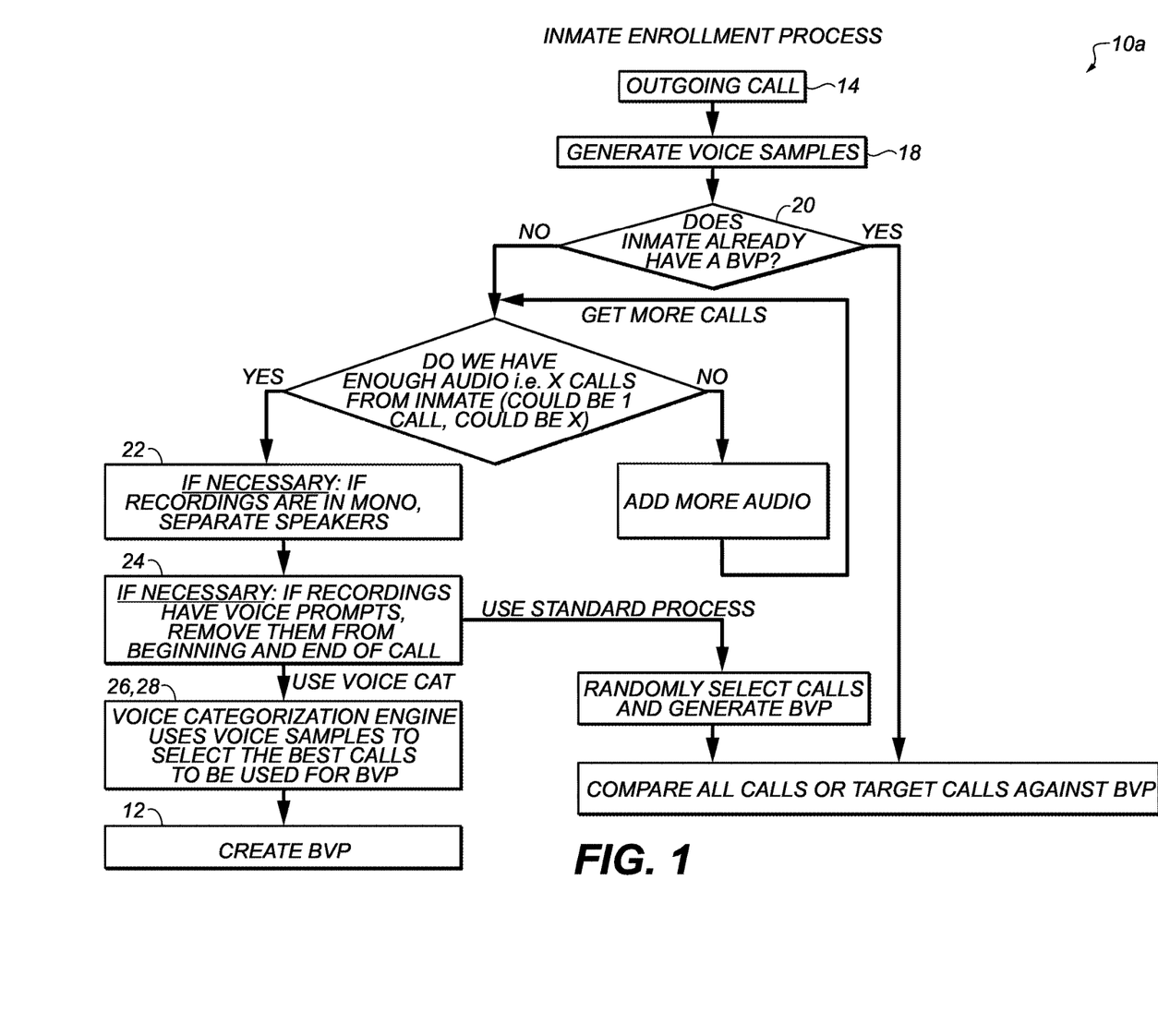
FIG. 1 is a schematic flow diagram showing a presently preferred process in accordance with the present invention for enrolling an inmate (inside) caller in the caller identification system.
Figure 2:
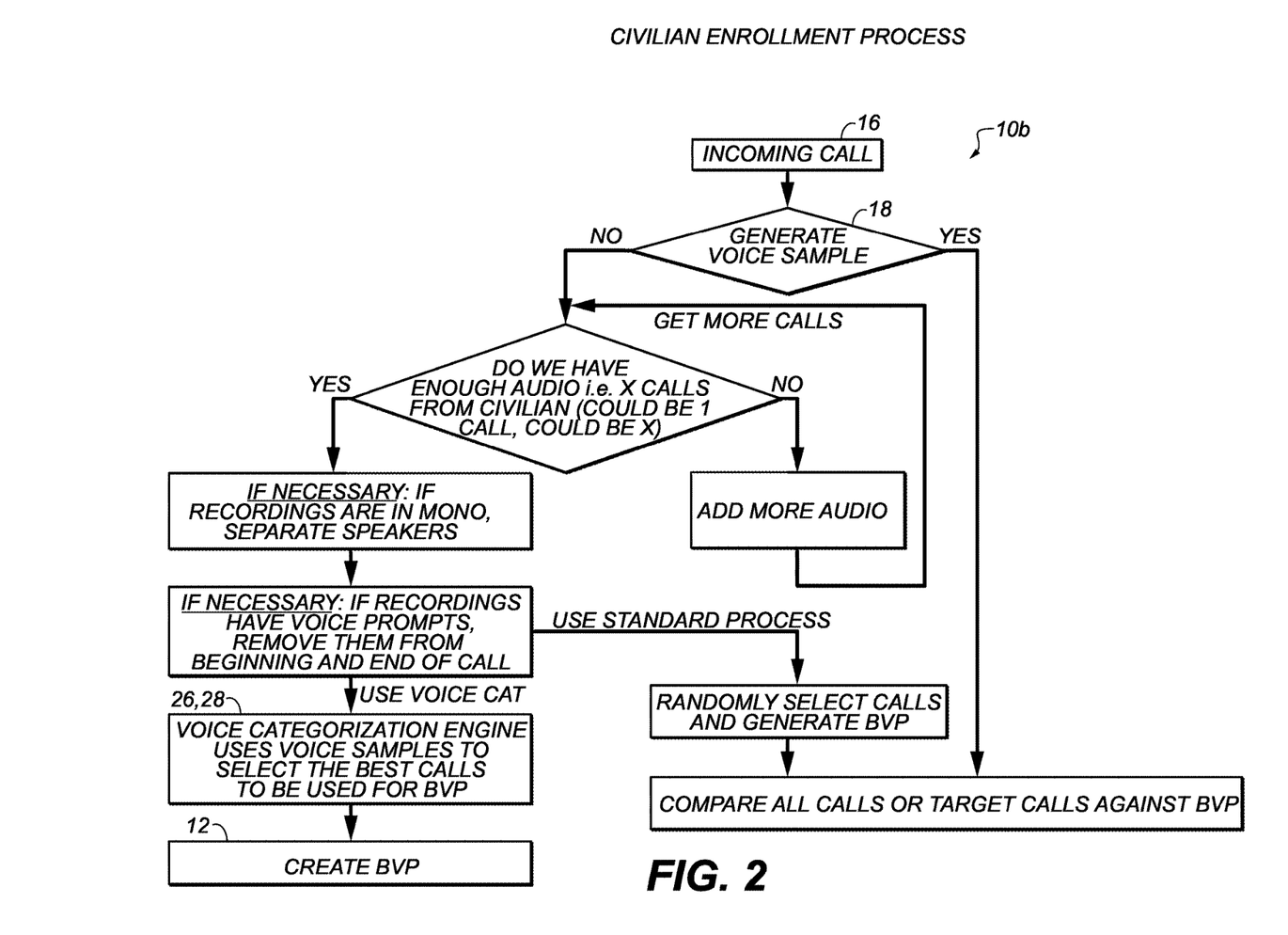
FIG. 2 is a schematic flow diagram showing a presently preferred process in accordance with the present invention for enrolling a civilian (outside) caller in the caller identification system.

Referring to FIGS. 1 and 2, the process 10a,10b for creating a BVP 12 is similar for either an inmate making outgoing calls 14 or a civilian making incoming calls 16 and comprises the steps of:
  a) downloading 18 at least one recorded call 20, and preferably a plurality of recorded calls, from a target person;
  b) separating 22 the speakers in each recording through a speaker separation process;
  c) preprocessing 24 the calls to normalize volume, suppress silences, and reduce ambient noise, and trimming the beginning and end of each recording to remove telephone system prompts;
  d) selecting 26 a plurality of recording segments judged to have the highest quality; and
  e) processing 28 the selected segments to create a BVP for the target person.

3. Authentification of Incoming or Outgoing Speaker with Existing BVP

Figure 3:
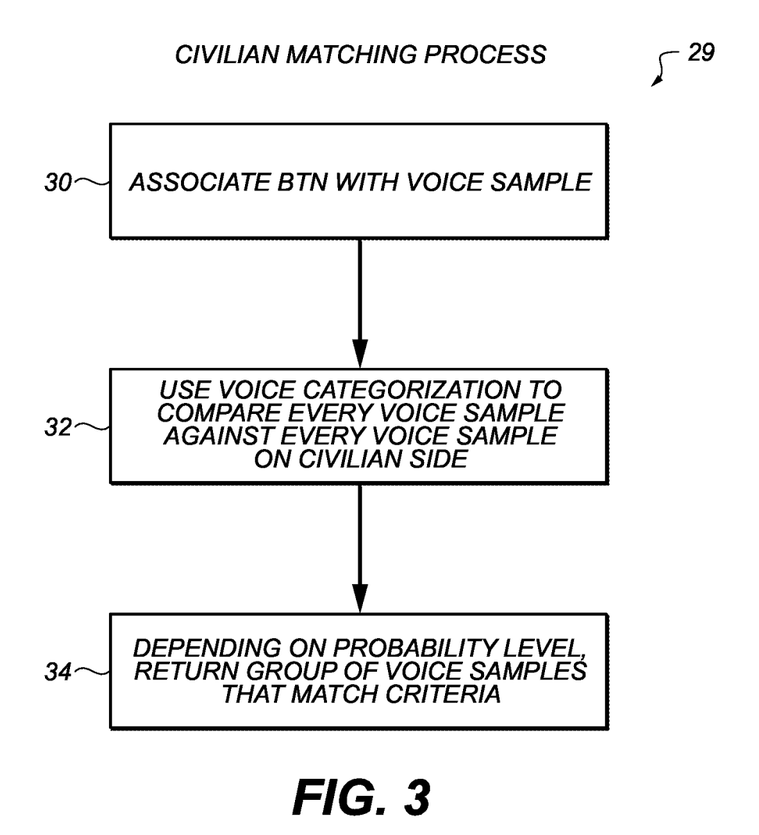
FIG. 3 is a schematic flow diagram showing how the system matches a civilian voice and associated billing telephone number via voice categorization to identify a civilian caller.

If a caller, e.g., a civilian caller 29 as shown in FIG. 3, has a BVP already stored in the system, the authentication process is as follows:
  a) uploading the call from the caller;
  b) associating 30 the Billing Telephone Number (BTN) with a voice sample of the caller;
  c) preprocessing the voice sample to normalize volume, suppress silence, and reduce ambient noise;
  d) separating the speakers in each recording through a speaker separation process to isolate a single speaker as the caller;
  e) trimming the beginning and end of the call to remove telephone system prompts;
  f) extracting at least seven seconds of net speech of the caller;
  g) using Voice Categorization 32 to process the extracted net speech by comparing every incoming voice sample against every voice sample existing in the civilian database; and
  h) matching 34 the speaker to a BVP by identifying all existing voice samples matched by the incoming voice sample.

The system is able to identify one or both speakers based upon as little as seven seconds of net speech in a single call, which permits the system to operate in real time and to continue to confirm speaker identification throughout the duration of the call.

In another embodiment, the process may also be run in real time via Continuous Window Processing to determine throughout the length of a call whether any of the speakers have changed. An occasion where this is useful is if the inmate is on a watch list and the agency wants to know who is leaving him a voice mail in real time.

Figure 4:
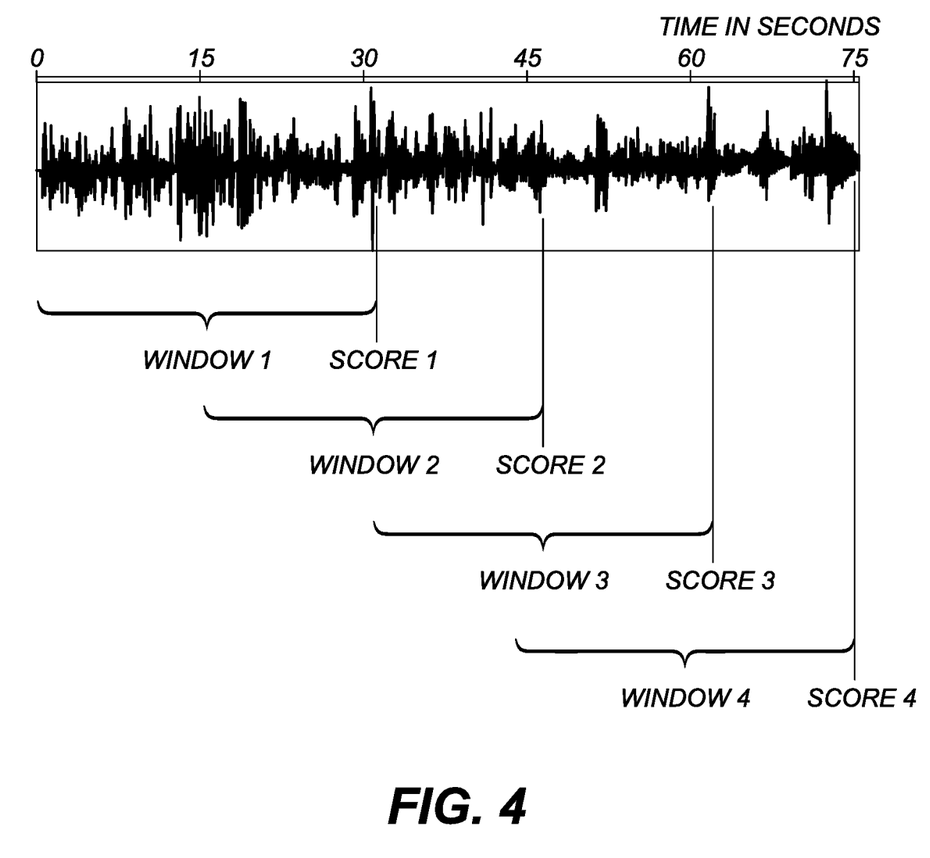
FIG. 4 is an exemplary voice print of a telephone call showing the use of overlapping windows of analysis to maintain voice identification throughout the call.

Referring to FIG. 4, the voice identification system is able to be configured for any desired length of time window of an incoming call and for any desired voice ID score. For example, if the default time window size is 30 seconds, as shown in FIG. 4, the first voice ID score is returned by the system 30 seconds into the call. However, the next window is started 15 seconds into the call and ends 30 seconds later at 45 seconds into the call, generating a second score which may be compared to the first score generated 15 seconds previously. This ensures that during the call every second of the call is run for speaker identification, e.g., FIG. 4 shows four overlapping 30 second windows 1 through 4 and caller scores 1 through 4 for a call of 75 seconds. Preferably the test windows are of equal length. Preferably the first test window is between 7 and 30 seconds in length, and said second test window begins between 3.5 and 15 seconds into the call.

4. Passive Enrollment of Outside Parties

One aspect of the current disclosure is the ability to create a BVP of a called party, whether inside or outside a facility, without the need for formal enrollment. In a preferred embodiment, the voice print of every speaker is processed against the voice print database. If no match is found, a trigger may automatically generate the creation of a new BVP. That person will be assigned by default the name of the called party, if known.

In another embodiment, a trigger for producing a BVP is based on the output from a data mining algorithm whose output is an Actionable Intelligence Potential (AIP) or Actionable Intelligence Score (AIS). The AIP/AIS is generated by mining the connections between the individual that has been called and other inmates/calls, emails, communications, financial transactions, etc. The trigger is based on one or more thresholds that can be adjusted as a function of the probability that the target speaker is a known Person of Interest (POI).

In another preferred embodiment, a trigger to create a BVP is based on certain keywords identified either automatically or manually by an investigator listening to a phone call. The investigator can then request that the system create a BVP for the individual, if a BVP does not already exist, and begin the process of searching for those calls based on the individual's voice.

The identification process is as follows:
a) uploading the call of the called party;
b) preprocessing the call to normalize volume, suppress silences, and reduce ambient noise;
c) separating the speakers in each recording through a speaker separation process;
d) trimming the beginning and end of the call to remove telephone system prompts;
e) extracting at least seven seconds of net speech of the called party;
f) processing the net speech of the called party against the BVP database;
g) matching the called party to a BVP;
h) if no match is found, triggering the creation of new BVP from the call;
i) if less than 30 seconds of net speech is available from the call, searching the call database for additional calls involving the called party;
j) if no other calls involving the called party can be found, then setting an alarm against the called party to use future calls to trigger creation of a new BVP; and running the call database against newly created BVP.

This procedure may be followed in real time, defined herein as being on a live telephone call rather than a recorded call. The call is processed through an SIP server which analyzes the call. After 7 seconds of speech, the system can identify the caller.

In another preferred embodiment, a cross-reference is kept of every incoming and outgoing telephone number against the BVPs of all inmates. Biometrics on voice mail recordings can be used, e.g., as follows:
1) identify the caller;
2) determine whether the caller is an ex-inmate/parolee (a POI);
3) alert the facility of a person of interest/under investigation who is leaving a voice mail;
4) identify instances of one caller using multiple numbers to leave VMs for the same inmate, or for multiple inmates.

5. Enhancement of BVPs

The ability to enhance an existing BVP over time is an important factor for ensuring that the identification accuracy of the BVP is as high as possible. A poor quality BVP will result in more false positive and false negative results. A BVP can be of poor quality for a number of reasons: one of the calls used to generate the BVP may erroneously include another speaker's voice, or the calls used were not of high quality to begin with, or more audio is needed to ensure that the BVP is of the highest quality. A proprietary algorithm automatically identifies BVPs that could use enhancement if they are consistently receiving poor identification scores. The system expects that if the correct person is being run against the BVP a certain threshold score should be attained; if it is not, the system flags the BVP for enhancement.

The enhancement can occur using multiple techniques. One way that the algorithm enhances the BVP is by using a call that has been through the identification process and has been assigned an exceptionally high score. This indicates that this call is an excellent representative sample of the person that is being identified and, as such, should be used to improve the BVP. This enhancement will make future identifications better as well as the BVP is what drives the accuracy of the system. This method of improvement can be used over and over to improve the BVP.

An additional method is a scheduled process whereby the system, after a designated period of time (e.g., week, month, three months, six months, etc.) selects the highest scoring identified calls and uses them to improve the appropriate BVPs (a call identified with a very high score for a particular individual is used to improve that individual's BVP). This process automatically occurs during the designated periods, ensuring that the BVP continues to improve and be of high quality.

6. Cluster Matching of BVP

There are circumstances where calls have been assigned by default to a particular target. This would be, for instance, when an outside party calls in and is assigned to a particular calling number. The system may not be able to identify the caller from the database. At a later date, the same person may be calling in and be personally identified. The original call assigned to the calling number is then reassigned to the newly identified caller, forming a call cluster. Additional calls from this or other numbers as identified are added to the cluster.

The introduction of a biometric identification for the person leaving the voice mail is invaluable for intelligence personnel and agencies. Often, the facility has a general idea of who should be tied to that number since the friends and family members often deposit funds for their loved ones in the prison and, in order to do so, must confirm their identity. This gives the process a starting point to match the person's voice to a telephone number. However, oftentimes there is no place to start in terms of identifying the caller. This is where proprietary software comes into use. Having the ability to voice print both sides of a call, the software can already have a voice associated with that number from previous calls to or from that number. The system then checks to see if the new voice print is a positive match. (Additionally, a voice mail is an excellent basis from which establish a voice print, as such a call is simply the person talking without interruption.) The system can create a BVP from the caller based on a VM and use it to identify the caller in the future. The biometric process can occur after the VM has been completed in an offline process. This can be the most efficient means of identifying the callers as each voice mail recording is run against the database of BVPs, and the identity with the accompanying score is returned.

What is claimed is:

1. A method for passive enrollment and identification of a speaker from a plurality of speakers in a subsequent telephone call to a called telephone number, comprising:
   a passive enrollment process including:
      downloading a plurality of recorded telephone calls to previously called telephone numbers, wherein the recorded telephone calls have no speaker authentication prompting;
      separating speakers in each recorded telephone call;
      trimming a beginning and end of each recorded telephone call to remove telephone system prompts; and
      processing the trimmed calls to create a text independent biometric voice print for each speaker in the recorded telephone calls and entering the text independent biometric voice prints into a biometric voice print database with a speaker identity;

the method further comprising an authentication process including:

separating speakers in the subsequent telephone call;

creating a biometric voice print for each speaker in the subsequent telephone call during and without interrupting the subsequent telephone call;

authenticating each speaker in the subsequent telephone call by comparing the biometric voice print for each speaker in the subsequent telephone call against entries in the biometric voice print database; and continuously creating a biometric voice print for each speaker during and without interrupting the subsequent telephone call and comparing the continuously created biometric voice print for each speaker against entries in the biometric voice print database during the subsequent telephone call to detect whether another party has been added to the subsequent telephone call or one of the previously authenticated speakers has been replaced.

2. A method in accordance with claim 1, comprising comparing biometric voice prints of speakers on later subsequent telephone calls against said text independent biometric voice prints entered into the biometric voice print database to authenticate the speakers on the later subsequent telephone calls.

3. A method in accordance with claim 2, comprising associating in a cluster all subsequent calls having biometric voice prints matching a biometric voice print in the biometric voice print database.

4. A method in accordance with claim 2 comprising the further steps of:

identifying telephone numbers associated with the later subsequent calls; and clustering all such telephone numbers in association with said called number.

5. A method in accordance with claim 1 comprising the further step of generating an alert if another party has been added to the subsequent telephone call or one of the previously authenticated speakers has been replaced.

6. A method in accordance with claim 1, comprising processing the trimmed calls to create a biometric voice print for each speaker in the recorded telephone calls and entering the biometric voice prints into the biometric voice print database if the trimmed calls are at least 7 seconds long.

7. A method in accordance with claim 1, comprising processing the trimmed calls to create a biometric voice print for each speaker in the recorded telephone calls and entering the biometric voice prints into the biometric voice print database if the trimmed calls are at least 30 seconds long.

8. A method in accordance with claim 1 comprising the further steps of:

downloading a plurality of additional recorded telephone calls from outgoing or incoming calls of at least one of the plurality of speakers;

trimming a beginning and end of each additional recorded telephone call to remove telephone system prompts;

processing the additional trimmed calls to create an additional text independent biometric voice print for the at least one of the plurality of speakers in the additional recorded telephone calls; and entering the additional text independent biometric voice print into said biometric voice print database to enhance a quality of said biometric voice print database.

9. A method in accordance with claim 1 wherein said plurality of speakers comprises one or more of an inmate within a secure facility and a civilian outside said secure facility.

10. A method in accordance with claim 1, comprising identifying at least two speakers of the plurality of speakers from a single call comprising speech of the at least two speakers.

11. A method in accordance with claim 1 comprising the further steps of:

determining whether at least one of the plurality of speakers is a person of interest;

alerting a facility upon determining that at least one of the plurality of speakers is a person of interest identifying instances of said at least one of the plurality of speakers using multiple telephone numbers to leave voice mail messages for the same or multiple other speakers, wherein the other speakers comprise inmates within a secure facility.

12. A method in accordance with claim 1 comprising the further steps of:

establishing overlapping windows within a length of said telephone call during which the biometric voice print for each speaker is continuously created;

starting a second overlapping window before an end of a first overlapping window such that said second overlapping window overlaps a portion of said first overlapping window; and starting one or more additional overlapping windows wherein each of said additional overlapping windows overlaps a portion of an immediately preceding overlapping window.

13. A method in accordance with claim 12 wherein each of said overlapping windows is equal in length.

14. A method in accordance with claim 12 wherein said first overlapping window is between 7 and 30 seconds in length, and wherein said second overlapping window begins between 3.5 and 15 seconds into said call.

15. A method in accordance with claim 1 wherein the subsequent telephone call is a live telephone call.

* * * * *